US006338784B1

(12) United States Patent
Terada et al.

(10) Patent No.: US 6,338,784 B1
(45) Date of Patent: *Jan. 15, 2002

(54) APPARATUS FOR PRODUCING DEIONIZED WATER

(75) Inventors: Ichiro Terada, Yokohama; Hiroshi Toda, Ichihara; Kazuo Umemura, Yokohama, all of (JP); Mark Philip Huehnergard, Guelph (CA); David Florian Tessier, Guelph (CA); Ian Glenn Towe, Guelph (CA)

(73) Assignees: Asahi Glass Company Ltd., Tokyo (JP); Glegg Water Conditioning, Incorporated, Ontario (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,943

(22) Filed: Feb. 26, 1998

(30) Foreign Application Priority Data

Feb. 27, 1997 (JP) .............................. 9-058602

(51) Int. Cl.$^7$ .............................. B01D 61/48
(52) U.S. Cl. ................. 204/632; 204/634; 204/636
(58) Field of Search .......................... 210/195.2, 198.2, 210/198.3, 202, 243, 253, 257.2, 264, 266, 283, 284, 287, 321.64, 321.75, 321.84, 435, 500.21, 502.1, 503; 204/632, 633, 634, 635, 636

(56) References Cited

U.S. PATENT DOCUMENTS 2,815,320 A    12/1957    Kollsman (List continued on next page.)

FOREIGN PATENT DOCUMENTS

AU    629 790    10/1992

(List continued on next page.)

OTHER PUBLICATIONS

U.S. application No. 08/898,957, filed Jul. 23, 1997, pending.

U.S. application No. 08/952,218, filed Nov. 21, 1997, pending.

U.S. application No. 09/030,943, filed Feb. 26, 1998, pending.

(List continued on next page.)

Primary Examiner—W. L. Walker
Assistant Examiner—David Sorkin
(74) Attorney, Agent, or Firm—Oblon, Spivak, McClelland, Maier & Neustadt, P.C.

(57) ABSTRACT

An apparatus for producing deionized water, comprising an electrodialyzer having cation exchange membranes and anion exchange membranes alternately arranged to form demineralizing compartments and concentrating compartments and having ion exchangers accommodated in the demineralizing compartments, and designed to conduct an electric current while supplying water to be treated to the demineralizing compartments, wherein a spacer is arranged in each concentrating compartment to maintain the thickness of the concentrating compartment, and the cation exchange membranes or the anion exchange membranes are incorporated in their dry state in the electrodialyzer, whereby water is supplied to the electrodialyzer, while each ion exchange membrane is brought in contact with the spacer by a pressure from the demineralizing compartment side.

16 Claims, 1 Drawing Sheet

U.S. PATENT DOCUMENTS

| | | | |
|---|---|---|---|
| 2,943,989 A | | 7/1960 | Kollsman |
| 3,149,062 A | | 9/1964 | Gottschal et al. |
| 3,755,135 A | | 8/1973 | Johnson |
| 4,033,850 A | | 7/1977 | Kedem et al. |
| 4,632,745 A | * | 12/1986 | Giuffrida et al. |
| 4,804,451 A | | 2/1989 | Palmer |
| 4,849,102 A | | 7/1989 | Latour et al. |
| 5,176,828 A | | 1/1993 | Proulx |
| 5,292,422 A | * | 3/1994 | Liang et al. |
| 5,316,637 A | * | 5/1994 | Ganzi et al. |
| 5,425,866 A | | 6/1995 | Sugo et al. |
| 5,584,981 A | | 12/1996 | Turner et al. |
| 5,759,373 A | | 6/1998 | Terada et al. |
| 5,944,972 A | * | 8/1999 | Toda et al. |

FOREIGN PATENT DOCUMENTS

| | | | |
|---|---|---|---|
| EP | 0 170 895 | | 2/1986 |
| EP | 503 651 | | 9/1992 |
| EP | 535 546 | | 4/1993 |
| EP | 680 932 | | 11/1995 |
| FR | 2 292 504 | | 6/1976 |
| GB | 776469 | | 6/1957 |
| GB | 893051 | | 4/1962 |
| GB | 942762 | | 11/1963 |
| GB | 1048026 | | 11/1966 |
| JP | A-61-107906 | * | 5/1986 |
| JP | A-1-307410 | * | 12/1989 |
| JP | A-3-186400 | * | 8/1991 |
| JP | A-5-64726 | * | 3/1993 |
| WO | WO 95/32052 | | 11/1995 |
| WO | WO 96/22162 | | 7/1996 |
| WO | WO 97/34696 | | 9/1997 |

OTHER PUBLICATIONS

U.S. application No. 09/040,309, filed Mar. 18, 1998, pending.

U.S. application No. 09/047,409, filed Mar. 25, 1998, pending.

U.S. application No. 09/057,450, filed Apr. 09, 1998, pending.

* cited by examiner

APPARATUS FOR PRODUCING DEIONIZED WATER

The present invention relates to an apparatus for producing deionized water, comprising an electrodialyzer having cation exchange membranes and anion exchange membranes alternately arranged to form demineralizing compartments and concentrating compartments and having ion exchangers accommodated in the demineralizing compartments, and designed to apply a voltage while supplying water to be treated to the demineralizing compartments.

As an apparatus for producing deionized water, it is common to obtain deionized water by passing water to be treated through a bed packed with an ion exchange resin so that impurity ions are removed as adsorbed on the ion exchange resin. Here, it is common to employ a method of regenerating the ion exchange resin having its adsorbing ability lowered, by means of an acid or alkali. Accordingly, this apparatus has a problem that a waste liquid of the acid or alkali used for the regeneration, is discharged. Therefore, an apparatus for producing deionized water which requires no such regeneration, is desired. From such a viewpoint, an attention has been drawn in recent years to an apparatus for producing deionized water by self-regenerating type electrodialysis wherein ion exchange resins are used in combination with ion exchange membranes. This apparatus comprises an electrodialyzer having anion exchange membranes and cation exchange membranes alternately arranged to form demineralizing compartments and concentrating compartments and having ion exchangers accommodated in the demineralizing compartments, and is designed to apply a voltage while supplying water to be treated to the demineralizing compartments to carry out electrodialysis to produce deionized water. With respect to this conventional apparatus, various developments or improvements have already been made. For example, there have been proposals for an apparatus wherein the width and thickness of the demineralizing compartments have been specified (JP-A-61-107906), an apparatus designed to permit water to be treated to pass at least twice through demineralizing compartments of a deionizing apparatus (JP-A-1-307410), and an apparatus wherein anion exchange resins are used as ion exchange resins to be packed in a portion where the water to be treated passes firstly (JPA-4-71624).

Ion exchange membranes to be used in such conventional apparatus for producing deionized water, were in a wet state and accordingly difficult to handle at the time of setting (or incorporating) in an electrodialyzer, and they had a drawback that they tend to shrink as they are gradually dried during the setting. To solve such a problem, it is conceivable to set them in a dry state, but the problem can not be solved simply by attempting to set the membranes in a dry state without any elaboration. Namely, the ion exchange membranes will be in contact with wet state ion exchange resins present adjacent thereto, whereby the ion exchange membranes will be wetted, and the above mentioned problem of difficulty in handling wet membranes can not be solved. Further, the membranes will deform due to swelling when water is supplied to the electrodialyzer, whereby defects such as creases are likely to form on the membranes. Also from this viewpoint, the merits in setting the membranes in a dry state have been negated.

It is an object of the present invention to solve such a problem and to provide an apparatus for producing deionized water, whereby deformation of ion exchange membranes can be suppressed even if they are set in a dry state, and a constant performance can be obtained.

The present invention provides an apparatus for producing deionized water, comprising an electrodialyzer having cation exchange membranes and anion exchange membranes alternately arranged to form demineralizing compartments and concentrating compartments and having ion exchangers accommodated in the demineralizing compartments, and designed to conduct an electric current while supplying water to be treated to the demineralizing compartments, wherein a spacer is arranged in each concentrating compartment to maintain the thickness of the concentrating compartment, and the cation exchange membranes or the anion exchange membranes are incorporated in their dry state in the electrodialyzer, whereby water is supplied to the electrodialyzer, while each ion exchange membrane is brought in contact with the spaced by a pressure from the demineralizing compartment side.

Figure 1:
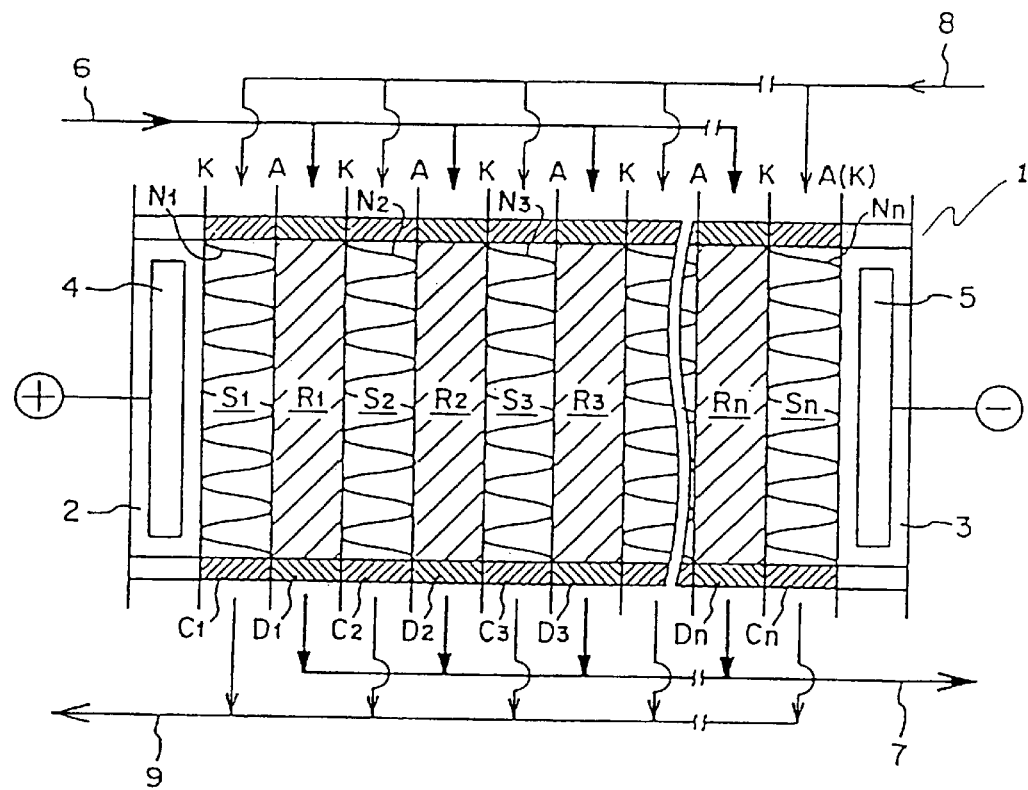
FIG. 1 is a view which schematically illustrates one embodiment of a self-regenerating type electrodialyzer apparatus.

Now, the present invention will be described in detail with reference to the preferred embodiments.

In the present invention, the dry state of cation exchange membranes and/or anion exchange membranes to be incorporated in the electrodialyzer, is preferably such that the water content is at most 10 wt %. If the water content exceeds 10 wt %, the dimensional change of the membranes due to a change in the external environment, particularly due to the change in humidity, tends to be substantial, such being undesirable. The water content is particularly preferably from 0.5 to 8 wt %, whereby there will be no substantial dimensional change due to a change in humidity. Further, the pressure from the demineralizing compartment side which is used in the present invention to bring each ion exchange membrane in contact with the spacer arranged in each concentrating compartment by the pressure from the demineralizing compartment side, is preferably from 0.1 to 10 $kg/cm^2$. If the pressure is less than 0.1 $kg/cm^2$, the membrane may not closely contact the spacer, whereby deformation by swelling of the membrane can not suppressed, such being undesirable. If the pressure is larger than 10 $kg/cm^2$, the membrane and the spacer are likely to undergo physical deformation by the pressure, such being undesirable. The pressure is particularly preferably from 0.5 to 5 $kg/cm^2$, whereby deformation by swelling of the membrane can adequately be controlled, and no deformation of the membrane or the spacer will be brought about by the pressure, whereby the performance will be stable.

In the present invention, as a means to create the pressure from the demineralizing compartment side in the electrodialyzer in order to bring the ion exchange membrane in contact with the spacer, it is preferred to employ either (1) a means wherein the ion exchangers are packed in their dry state in the demineralizing compartments, and water is supplied to the electrodialyzer to let the ion exchangers swell to produce the pressure, (2) a means wherein the thickness of each demineralizing compartment is reduced by mechanical pressure so as to create the pressure due to the volume reduction of the demineralizing compartment, or (3) a means wherein the water pressure in the demineralizing compartments is made higher than the water pressure in the concentrating compartments to create the pressure.

Among them, the above means (1) wherein the ion exchangers are packed in their dry state in the demineralizing compartments, is most preferred, since it is simple and effective. By such a means (1), the water content of the ion exchangers in their dry state is preferably at most 15 wt %. If the water content exceeds 15 wt %, when the ion exchangers are brought in contact with the ion exchange membranes in their dry state, the ion exchange membranes will be swelled, thus leading to a dimensional change, such being undesirable. In the means (2) for utilizing the pressure created by reducing the thickness of each demineralizing compartment by mechanical pressure, as a compartment frame for each demineralizing compartment, a frame which is compression-deformable by mechanical pressure, may be employed, or a sheet which is compression-deformable by mechanical pressure, may be inserted between the membrane and the compartment frame for each demineralizing compartment.

In the present invention, the spacer to be arranged in each concentrating compartment of the electrodialyzer, is preferably in the form of a net, such as a woven or non-woven fabric made of a plastic, and its structure is preferably such that the string diameter is from 0.1 to 2 mm, and the pitch is from 1 to 10 mm. Here, the pitch is the distance between diagonal points of a rhomb, square or rectangle of an opening in the net (the distance between the centers of strings). If the string diameter is smaller than 0.1 mm, the strength of the net tends to be low, such being undesirable. Further, if the string diameter is larger than 2 mm, the electric shielding tends to be high, when an electric current is conducted with the pitch being within a range of from 1 to 10 mm, whereby the demineralizing efficiency tends to be low, such being undesirable. If the pitch is smaller than 1 mm, the shielding tends to be high, and if it exceeds 10 mm, the ion exchange membrane pressed against the net, can not adequately be supported, and defects such as pin holes are likely to form, such being undesirable. As is evident from the foregoing description, the spacer is not limited to a net, and its structure may be any structure so long as it is thereby possible to maintain the predetermined space i.e. thickness for the concentrating compartment and to minimize the shielding of the electric current.

As the ion exchange membranes to be used in the present invention, it is, of course, possible to use homogeneous ion exchange membranes. However, from the viewpoint of the strength and flexibility, they are preferably heterogeneous ion exchange membranes composed of ion exchange resin particles and a binder polymer. As a method for producing such heterogeneous ion exchange membranes, a method is preferably employed in which an ion exchange resin of a powder particle form and a binder polymer are mixed and kneaded under heating, followed by heat extrusion molding to form a sheet.

The particle sizes of ion exchange resin particles are preferably such that the maximum particle size is at most 150 μm, those having particle sizes of from 100 to 150 μm are at most 5 wt % of the entire ion exchange resin particle material, and those having particle sizes of at most 20 μm are at most 20 wt %.

If the maximum particle size exceeds 150 μm, or if those having particle sizes of from 100 to 150 μm exceed 5 wt %, pin holes are likely to form in heterogeneous ion exchange membranes thereby molded, or the mechanical strength of such membranes tends to be low, such being undesirable. If ion exchange resin particles having particle sizes of at most 20 μm exceed 20 wt %, the surface area of the ion exchange resin particles tends to remarkably increase, and kneading with the binder polymer tends to be inadequate, whereby defects tend to form, such being undesirable. If it is attempted to carry out heat kneading adequately to eliminate such defects, it will take time, or the kneading temperature will have to be higher, thus leading to decomposition of ion exchange groups, whereby the electrical resistance of the membranes tends to substantially increase, such being undesirable.

The binder polymer for the heterogeneous ion exchange membranes may, for example, be low density polyethylene, linear low density polyethylene, ultrahigh molecular weight high density polyethylene, high density polyethylene, polypropylene or a mixture thereof with a flexible rubber material. Among them, a mixture of low density polyethylene with a rubber consisting one or both of ethylene-propylene rubber and ethylene-propylene-diene rubber, is a particularly preferred polymer from the viewpoint of the elongation, flexibility and the strength of the resulting ion exchange membranes. The content of the ethylene-propylene rubber or the ethylene-propylenediene rubber in the mixture of low density polyethylene with ethylene-propylene rubber or ethylene-propylenediene rubber, is preferably from 10 to 50 wt %. If the rubber content is less than 10 wt %, the resulting membranes tend to be brittle, and if it exceeds 50 wt %, the membranes tend to be soft and weak against deformation by pressure, such being undesirable. The rubber content is particularly preferably from 25 to 35 wt %, whereby a binder polymer excellent in the above mentioned physical properties will be obtained, and its molding will be easy.

Other polymer may be blended to the mixture of low density polyethylene with ethylene-propylene rubber or ethylene-propylene-diene rubber, for use as a binder polymer. In such a case, the polymer to be blended is preferably a polyhydrocarbon olefin such as high density polyetylene, ultrahigh molecular weight high density polyethylene, polypropylene or polyisobutylene. The blend ratio of the pulverized ion exchange resin particles to the binder polymer is preferably such that the weight ratio of ion exchange resin/binder polymer is from 40/60 to 70/30. If the ion exchange resin is less than 40 wt %, the electric resistance of the resulting heterogeneous ion exchange membranes tends to remarkably increase, such being undesirable. If the ion exchange resin exceeds 70 wt %, the mechanical strength tends to be low, and molding tends to be difficult.

The ion exchangers to be accommodated in the demineralizing compartments of the electrodialyzer, may, for example, be a dried ion exchange resin, or in the form of a porous ion exchanger prepared by molding an ion exchange resin into a sheet by means of a binder polymer. As a method for molding into a sheet, the dried ion exchange resin and the binder polymer may be heated and mixed, or the binder polymer may be dissolved in a solvent and then mixed with the ion exchange resin, followed by removal of the solvent. The ion exchanger molded into a sheet is efficient in handling, its packing is easy, and contact of the ion exchange resin particles in itself is good, whereby the electric resistance will be low, and thus, it is an ion exchanger suitable for use in the present invention. The porosity of the porous ion exchanger is preferably at least 5 volume % as the proportion of continuous pores relating to permeation of the liquid. If the porosity is smaller than 5 volume %, the flow rate of the liquid decreases, and the pressure loss increases, such being undesirable. The porosity is particularly preferably from 10 to 40%, whereby the water permeation is good, the demineralizing performance is excellent, and treated water of high purity can be obtained. This porosity is a value as the porous sheet is accommodated in a demineralizing compartment and is being used.

The porous ion exchanger may be formed of cation exchange resin particles, anion exchange resin particles, or a mixture thereof, or it may have a structure in which domains of cation exchange resin particles and domains of anion exchange resin particles are phase-separated in a sea-island pattern. However, the ratio of the cation exchange resin particles to the anion exchange resin particles to be used, is preferably such that the total ion exchange capacity ratio of cation exchange resin/anion exchange resin is from 30/70 to 80/20. If the total ion exchange capacity ratio is outside this range, the purity of treated water tends to be low, such being undesirable. The weight proportion of the binder polymer used for the porous ion exchanger is preferably at most 20% relative to the total weight of the porous ion exchanger. If the weight proportion is larger than 20%, the binder polymer is likely to cover the surface of the ion exchange resin particles, whereby the adsorbing ability tends to be low, and the porosity tends to be low, whereby the flow rate of the liquid to be treated tends to decrease, and the pressure loss tends to increase, such being undesirable. The weight ratio of the binder polymer is particularly preferably from 1 to 5%.

As the binder polymer, a thermoplastic polymer or a solvent-soluble polymer is preferred from the viewpoint of the process for producing the porous ion exchanger. As such a binder polymer, the following is preferably employed. Firstly, as the thermoplastic polymer, low density polyethylene, linear low density polyethylene, ultrahigh molecular weight high density polyethylene, polypropylene, polyisobutylene, polyvinyl acetate, or an ethylene-vinyl acetate copolymer, may, for example, be mentioned. As the solvent-soluble polymer, natural rubber, butyl rubber, polyisoprene, polychloroprene, styrene-butadiene rubber, nitrile rubber, or a vinyl chloride-fatty acid vinylester copolymer, may, for example, be mentioned.

The thickness of the porous ion exchanger sheet having the ion exchange resin bound by the binder polymer, is preferably from 1 to 300 mm. If the thickness is thinner than 1 mm, the thickness of the mineralizing compartment accommodating it will also be very thin. Consequently, water tends to hardly flow, whereby the amount of water treated tends to be small, such being undesirable. If the thickness exceeds 300 mm, the electric resistance tends to be high, such being undesirable. The thickness of the ion exchange resin sheet is more preferably from 3 to 50 mm. This thickness is a value as the porous sheet is accommodated in a demineralizing compartment and is being used.

In the present invention, as an apparatus for producing deionized water, it is preferred to use an electrodialyzer as disclosed, for example, in JP-A-3-186400, JP-A-2-277526, JP-A-5-64726, U.S. Pat. Nos. 4,632,745 and 5,425,866. Namely, the electrodialyzer comprises a plurality of cation exchange membranes and anion exchange membranes alternately arranged, preferably via compartment frames, between an anode compartment provided with an anode and a cathode compartment provided with a cathode. In such a case, in the present invention, the cation exchange membranes and the anion exchange membranes are incorporated in their dry state. In this case, if the ion exchangers to be accommodated in the demineralizing components, are in the form of sheets, such ion exchanger sheets are inserted between the ion exchange membranes.

Thus, in the electrodialyzer, demineralizing compartments each defined by an anion exchange membrane on the anode side and by a cation exchange membrane on the cathode side, and concentrating compartments each defined by a cation exchange membrane on the anode side and by an anion exchange membrane on the cathode side, are alternately formed, preferably in a total number of from 2 to 50 units. The thickness of a picture frame-like compartment frame having an opening at its center, which is present between a cation exchange membrane and an anion exchange membrane, determines the thickness of the demineralizing compartment or the concentrating compartment. The thicknesses of the compartment frames of the demineralizing compartments and the concentrating compartments may not necessarily be the same. The ion exchange membranes may be of a homogeneous type or a heterogeneous type, and in order to increase the mechanical strength, the one reinforced by a woven fabric or a non-woven fabric, may be used. In a concentrating compartment, it is preferred to insert a spacer of a net form in order to maintain its thickness to a predetermined level. If ion exchangers are not yet accommodated in the demineralizing compartments of the electrodialyzer thus assembled, granular ion exchangers will be incorporated at this stage.

Then, while supplying water to be treated to the demineralizing compartments of the electrodialyzer and water to discharge concentrated salts to the concentrating compartments, the ion exchange membranes of the electrodialyzer are permitted to swell by both waters to bring the ion exchange membranes in contact with the spacers and thereby to set them in a steady state, whereupon by conducting an electric current, demineralization of the water to be treated, can be carried out. It is also possible that without supplying the water to be treated from the beginning, a liquid which is preferably similar to the water to be treated, may be supplied to preliminarily swell and set the ion exchange membranes and the ion exchangers accommodated in the demineralizing compartments. During normal operation of the electrodialyzer, preferably, a voltage of from 4 to 20 V is applied to each unit cell to conduct an electric current preferably at a current density of from 0.00001 to 0.05 A/cm$^2$.

FIG. 1 is a view which schematically illustrates an embodiment of the electrodialyzer of such a type. In FIG. 1, A is an anion exchange membrane, and K is a cation exchange membrane. As shown, the anion exchange membranes A and the cation exchange membranes K are arranged in the electrodialyzer 1 via demineralizing compartment frames $D_1$, $D_2$, $D_3$ . . . $D_n$ and concentrating compartment frames $C_1$, $C_2$, $C_3$ . . . $C_n$ at predetermined distances, to form an anode compartment 2, concentrating compartments $S_1$, $S_2$ . . . $S_n$, demineralizing compartments $R_1$, $R_2$ . . . $R_n$ and a cathode compartment 3. In the demineralizing compartments $R_1$, $R_2$ . . . $R_n$, anion and cation exchange resins are accommodated or packed. In the concentrating compartments, spacers $N_1$, $N_2$, $N_3$ . . . $N_n$ are inserted.

In FIG. 1, reference numeral 4 indicates an anode, and numeral 5 indicates a cathode. A predetermined voltage is applied across the two electrodes during the operation, whereby anion components in the liquid to be treated which is introduced into the demineralizing compartments $R_1$, $R_2$ . . . $R_n$ from a conduit 6, will permeate and move to the concentrating compartments on the anode side through the anion exchange membranes A, while cation components in the liquid to be treated will permeate and move to the concentrating compartments on the cathode side through the cation exchange membranes K, and the liquid to be treated itself will be deionized and discharged via a conduit 7. Further, water or a concentrating liquid is introduced into the respective concentrating compartments $S_1$, $S_2$ . . . $S_n$ from a conduit 8, and the anion and cation components permeated and moved as described above, will be collected and discharged as a concentrated solution from a conduit 9.

Cations in the water to be treated, which are captured by the cation exchangers in the demineralizing compartments, will have a driving force given by the electric field, will reach the cation exchange membranes via cation exchangers which are in contact with the cation exchangers which captured the cations, and further, they will pass through the membranes and move to the concentrating compartments. Likewise, anions in the water to be treated which are captured by the anion exchangers will move to the concentrating compartments via anion exchangers and the anion exchange membranes. Accordingly, it is further preferred that the cation exchangers and the anion exchangers are, respectively, gathered to form domains or gathered regions, whereby contact points of exchanger particles of the same ion type increase remarkably, so that movement of ions is facilitated, and the deionization performance will be improved.

Now, the present invention will be described in further detail with reference to Examples. However, it should be understood that the present invention is by no means restricted to such specific Examples.

EXAMPLE 1

As a binder polymer, 70 wt % of low density polyethylene and 30 wt % of ethylene-propylene-diene rubber were mixed and kneaded by a laboplasto mill at 150° C. for 30 minutes to obtain a mixture. On the other hand, as an ion exchange resin, Diaion SK-1B (styrene-divinylbenzene copolymer resin, ion exchange groups: —$SO_3Na$ type, apparent density: 0.825 g/ml, water content: 43—50 wt %, ion exchange capacity: 2.0 meq/ml) manufactured by Mitsubishi Chemical Corporation, which is a strongly acidic cation exchange resin, was used, and it was dried in hot air at 60° C. for 24 hours and then pulverized by a jet mill. The pulverized particles were sieved by a stainless steel meshed sieve to remove particles having particle sizes exceeding 150 μm. The particle size distribution of the particles of the obtained ion exchange resin powder having particle sizes of at most 150 μm, was measured by sieving, whereby those having particle sizes of from 100 to 150 μm were 1.2 wt %, and particles having particle sizes of at most 20 μm were 12 wt %.

Such ion exchange particles and the above mentioned low density polyethylene/ethylene-propylene-diene rubber mixture were mixed in a blend ratio of 60/40 (weight ratio), followed by kneading by a laboplasto mill at 130° C. at 50 rpm for 20 minutes. The obtained kneaded product was heat-melt pressed at 160° C. by a flat plate press to obtain a cation exchange membrane having a thickness of 500 μm. In its wet state, the obtained membrane had a breaking strength of 2.8 MPa, a breaking elongation of 160% and a burst strength of 0.15 MPa. Further, the water content in its dry state was 2.4 wt %, and the dimensional change when wetted, was 115%, relative to 100% in its dry state.

In a similar manner, an anion exchange membrane having a thickness of 500 μm was prepared by using Diaion SA-10A (styrene-divinylbenzene copolymer resin, ion exchange groups: —$N(CH_3)_3Cl$ type, apparent density; 0.685 g/ml, water content: 43—47 wt %, ion exchange capacity: 1.3 meq/ml) manufactured by Mitsubishi Chemical Corporation, which is a strongly basic anion exchange resin, as an ion exchange resin. The particle size distribution of particles of the ion exchange resin powder having particle sizes of at most 150 μm was such that those having particle sizes of from 100 to 150 μm were 0.9 wt %, and particles having particle sizes of at most 20 μm were 8 wt %. In its wet state, the obtained membrane had a breaking strength of 2.5 MPa, a breaking elongation of 150% and a burst strength of 0.13 MPa. Further, the water content in its dry state was 2.2 wt %, and the dimensional change when wetted, was 112%, relative to 100% in its dry state.

Then, a sodium sulfonate type cation exchange resin (Diaion SK-1B, tradename, manufactured by Mitsubishi Chemical Corporation) having an ion exchange capacity of 4.5 meq/g dry resin and a quaternary ammonium salt type anion exchange resin (Diaion SA-10A, tradename, manufactured by Mitsubishi Chemical Corporation) having an ion exchange capacity of 3.5 meq/g dry resin, were dried in hot air at 50° C. to a water content of 8 wt %, and then they were mixed in a ratio of cation exchange resin/anion exchange resin=44/56 (weight ratio in dry state) to obtain a mixture having an ion exchange capacity ratio of 50/50. To this mixture, 3 wt % of a linear low density polyethylene (Affinity SM-1300, tradename, manufactured by Dow Chemical Company) was mixed, followed by kneading at a temperature of from 120 to 130° C. The obtained kneaded product was heat-molded at 130° C. by a flat plate press to obtain a porous ion exchanger sheet having a thickness of 0.6 cm. The porosity of continuous pores of this porous sheet was 23 volume % and the water content was 2.5 wt %.

The above dry state porous ion exchange sheet, cation exchange membrane and anion exchange membrane were arranged between an anode and a cathode in 5 sets in the sequence of spacer net/anion exchange membrane/porous ion exchange sheet/cation exchange membrane, to assemble an electrodialyzer as shown in FIG. 1. The thickness of each demineralizing compartment of the electrodialyzer was 8 mm. The spacer net (openings: rhomb) disposed in each concentrating compartment was made of polypropylene and had a string diameter of 0.5 mm, a pitch of 3 mm (the distance between the centers of strings located at the diagonal points) and a thickness of 1.2 mm at the crossing point of strings, and the thickness of each concentrating compartment frame was 1.2 mm. Further, the packing volume proportion of the porous ion exchange sheet in its dry state in each demineralizing compartment was 54%.

It was a 5 pair filter press type dialyzer having an effective area of 520 $cm^2$, wherein, as shown in FIG. 1, demineralizing compartment frames (made of polypropylene having a thickness of 8 mm) and concentrating compartment frames (made of polypropylene having a thickness of 1.2 mm) were present between the respective cation exchange membranes and anion exchange membranes. Water having an electroconductivity of 5 μS/cm was supplied for 10 minutes to the demineralizing compartments, the concentrating compartments and both electrode compartments of the electrodialyzer, followed by conducting an electric current for 15 hours for pretreatment to sufficiently wet the ion exchange membranes and the porous ion exchangers, whereupon production of deionized water was carried out. Water having an electroconductivity of 5 μS/cm was used as the water to be treated, and demineralization was carried out by applying a voltage of 4 V per unit cell, whereby pure water having an electroconductivity of 0.06 μS/cm was constantly obtained at a production rate of 0.45 $m^3$/hr.

Figure 2:
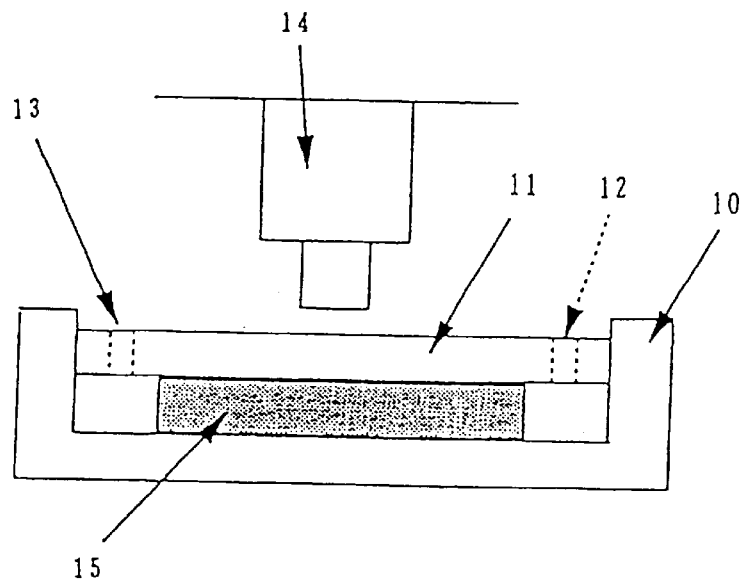
FIG. 2 is a view which illustrates an apparatus used to measure the pressure created by supplying water to dry ion exchangers in Examples.

After the measurement, the ion exchange membranes were taken out, and their state was inspected, whereby they were found as pressed against the spacer nets without creasing, and their sizes immediately after being disassembled, were 103% of the dry state in the case of the cation exchange membranes, and 102% of the dry state in the case of the anion exchange membranes. Thus, the dimensional changes were found to be suppressed. Further, the porous ion exchange sheets in the demineralizing compartments were taken out, and their volumes were measured and found to be 121% of the volumes of the demineralizing compartments. The same material in the same dry state was put into a metal container having the same size as the demineralizing compartment as shown in FIG. 2, and water was supplied to let it swell, whereby the created pressure i.e. the expansion pressure, was measured and found to be 1.5 kg/cm$^2$.

The measurement of the expansion pressure is carried out by the apparatus illustrated in FIG. 2 as follows.

An ion exchanger 15 in a dry state as a test sample is put into a metal container 10 of a rectangular parallelopiped, and a metal plate 11 is placed thereon, whereupon the position of a load cell 14 is adjusted so that the forward end of the load cell 14 will contact the metal plate 11 when the ion exchanger 15 swells to a thickness equal to the thickness of the demineralizing compartment (8 mm in the case of Examples). Namely, the position of the load cell is set so that when the ion exchanger 15 is in a dry state, the sum of the distance between the forward end of the load cell 14 and the metal plate 11 and the thickness of the ion exchanger 15 will be equal to the thickness of the demineralizing compartment (8 mm in the case of Examples). Then, water is supplied from a water supply inlet 12 and/or 13, and from a load exerted to the load cell 14 when absorption of water reaches equilibrium, the pressure between the ion exchanger 15 and the metal plate 11 is obtained.

EXAMPLE 2

A test was carried out in the same manner as in Example 1 except that as an ion exchanger packed in the demineralizing compartments, a dry mixture of a sodium sulfonate type cation exchange resin (Diaion SK-1B, tradename, manufactured by Mitsubishi Chemical Corporation) having a particle size of from 400 to 600 μm and an ion exchange capacity of 4.5 meq/g dry resin and a quaternary ammonium salt type anion exchange resin (Diaion SA-10A, tradename, manufactured by Mitsubishi Chemical Corporation) having a particle size of from 400 to 600 μm and an ion exchange capacity of 3.5 meq/g dry resin, was used, and the structure of the demineralizing compartments was modified to a structure capable of preventing flowing out of the granular ion exchange resins. The water content of the dry mixture was 8 wt %, and the blend ratio of cation exchange resin/anion exchange resin was 44/56 (weight ratio in dry state), and the ion exchange capacity ratio was 50/50. The dry ion exchange resin mixture was packed into the demineralizing compartments at a volume packing proportion of 55%.

In the same manner as in Example 1, the ion exchange membranes and the ion exchange resins were thoroughly wetted by supplying water for 10 minutes to the respective compartments of the electrodialyzer and the pretreatment by conducting an electric current for 15 hours, and then a test for producing deionized water was carried out. As the electrodialyzer, one having an effective area of 520 cm$^2$×5 pairs, was used. Using water having an electroconductivity of 5 μS/cm as the water to be treated, demineralization was carried out by applying a voltage of 4 V per unit cell, whereby treated water having an electroconductivity of 0.08 μS/cm was constantly obtained at a production rate of 0.39 m$^3$/hr. After the measurement, the ion exchange membranes were taken out, and their state was inspected, whereby they were found to be pressed against the spacer nets without creasing, and their sizes immediately after being disassembled were 104% of the dried state in the case of the cation exchange membranes, and 103% of the dry state in the case of the anion exchange membranes. Thus, the dimensional change was found to be suppressed. Further, the ion exchange resins in the demineralizing compartments were taken out, and the volume was measured and found to be 123% of the volume of the demineralizing compartments. The same amount of a porous ion exchanger in the same dry state was put into a metal container having the same size as the demineralizing compartment, as shown in FIG. 2, and water was supplied, and the pressure created was measured in the same manner as in Example 1, whereby the pressure was found to be 1.3 kg/cm$^2$.

COMPARATIVE EXAMPLE 1

A test was carried out in the same manner as in Example 2 except that as an ion exchanger packed in the demineralizing compartments, the granular ion exchange resin mixture was used in a wet state. At the time of assembling the electrodialyzer, by the water of the ion exchange resins, the membranes in a dry state were swelled and underwent a dimensional change, whereby the membranes could not properly be set.

COMPARATIVE EXAMPLE 2

A test was carried out in the same manner as in Example 1 except that concentrating compartment frames having a thickness of 1.6 mm were used without using spacer nets in the concentrating compartments. The ion exchange membranes and the porous ion exchange sheets were thoroughly wetted by supplying water for 10 minutes and the pretreatment by conducting an electric current for 15 hours, and then a test for treating water was carried out, whereby there was no flowing out of concentrated water from the concentrating compartments, and it was impossible to carry out the operation. After the test, the ion exchange membranes were taken out, and their state was inspected, whereby the membranes were found to be pressed and deformed by the ion exchange sheets to close the concentrating compartments.

COMPARATIVE EXAMPLE 3

A test was carried out in the same manner as in Example 2 except that the ion exchangers to be packed in the demineralizing compartments, were packed at a volume packing proportion of 45%. The ion exchange membranes and the granular ion exchange resins were thoroughly wetted by supplying water for 10 minutes and the pretreatment by conducting an electric current for 15 hours, and then a test for treating water was carried out. As the electrodialyzer, one having an effective area of 520 cm$^2$×5 pairs, was employed. Using a water having an electroconductivity of 5 μS/cm as the water to be treated, demineralization was carried out by applying a voltage of 4 V per unit cell, whereby treated water having a low purity with an electroconductivity of 0.25 μS/cm, was obtained at a production rate of 0.35 m$^3$/hr.

After the measurement, the ion exchange membranes were taken out, and their state was inspected, whereby they were found to be not pressed against the spacer nets and had many creases, and many pin holes were observed at the peaks of the creases. Their sizes immediately after being disassembled were 112% of the dried state in the case of the cation exchange membranes and 110% of the dry state in the case of the anion exchange membranes. Thus, the dimensional change was found to be not substantially suppressed. Further, the granular ion exchange resins in the demineralizing compartments were taken out, and their volumes were measured and found to be 101% of the volumes of the demineralizing compartments. The same amount of the granular ion exchange resins in the same dry state was put into a metal container having the same size as the demineralizing compartment as shown in FIG. 2, and water was supplied and the pressure thereby created, was measured, whereby the pressure was found to be 0.05 kg/cm$^2$.

According to the present invention, ion exchange membranes can be set in a dry state in an electrodialyzer, and yet, the swelling deformation of membranes even after supplying water can be suppressed by bringing the ion exchange membranes in contact with the spacers by the pressure from the mineralizing compartment side, whereby mounting of the ion exchange membranes is simple. Further, there is a merit that formation of creases of the membranes due to the swelling deformation of the membranes can be avoided during the mounting or the subsequent supplying of water. Further, according to the present invention, particularly in the case where the means to create the pressure from the demineralizing compartment side in the electrodialyzer to bring the ion exchange membranes in close contact with the spacers, is such that the ion exchangers are packed in a dry state in the demineralizing compartments, and water is supplied to the electrodialyzer to let the ion exchangers swell to create the pressure, the handling efficiency is particularly excellent, whereby the costs can be reduced.

What is claimed is:

1. A method of assembling an apparatus for producing deionized water, comprising an electrodialyzer having cation exchange membranes and anion exchange membranes alternately arranged to form demineralizing compartments and having ion exchangers arranged in the demineralizing compartments, and designed to conduct an electric current while supplying water to be treated to the demineralizing compartments, which method comprises:

a) arranging a spacer in the form of a net in each concentrating compartment to maintain the thickness of each concentrating compartment;

b) incorporating the cation exchange membranes or the anion exchange membranes in a dry state in the electrodialyzer; and c) supplying water to the electrodialyzer, while a pressure from the demineralizing compartment side is created to bring each ion exchange membrane in contact with the spacer;

wherein the spacer has a string diameter of from 0.1 to 2 mm and a pitch from 1 to 10 mm.

2. The method of claim 1, wherein the pressure from the demineralizing compartment side is from 0.1 to 10 kg/cm$^2$.

3. The method of claim 1, wherein the pressure from the demineralizing compartment side is created in such a manner that water supplied to the electrodialyzer causes the ion exchangers to swell, thereby creating pressure.

4. The method of claim 1, wherein the pressure from the demineralizing compartment side is created such that the thickness of each demineralizing compartment is reduced by mechanical pressure, thereby generating the pressure due to a reduction of a thickness of the demineralizing compartment.

5. The method of claim 1, wherein the pressure from the demineralizing compartment side is generated in such a manner that the water pressure in the demineralizing compartments is made higher than the water pressure in the concentrating compartments to create the pressure.

6. The method of claim 1, wherein the ion exchange membranes are heterogeneous ion exchange membranes composed of ion exchange resin particles and a binder polymer.

7. The method of claim 1, wherein the ion exchangers arranged in the demineralizing compartments are a porous body having a cation exchange resin, an anion exchange resin or a mixture of a cation exchange resin and an anion exchange resin bonded by a binder resin.

8. The method of claim 1, wherein the cation or the anion exchange membranes in a dry state contain a water content of at most 10 wt %.

9. The method of claim 8, wherein the cation or the anion exchange membranes in a dry state contain a water content of from 0.5 to 8 wt %.

10. The method of claim 1, wherein the pressure from the demineralizing compartment side is from 0.1 to 10 kg/cm$^2$.

11. The method of claim 10, wherein the pressure of the demineralizing compartment side is from 0.5 to 5 kg/cm$^2$.

12. The method of claim 1, wherein said cation and anion exchange membranes comprise ion exchange resin particles having a maximum particle size of at most 150 μm, with particle sizes of from 100 to 150 μm being at most 5 wt %, and wherein particles having sizes of at most 20 μm comprise at most 20 wt % of the total.

13. The method of claim 1, wherein the spacer in each concentrating compartment is made of woven or non-woven material.

14. The method of claim 1, wherein the spacer in each concentrating compartment is made of plastic.

15. The method of claim 1, wherein the spacer in each concentrating compartment has net openings which are square, rectangular or rhombohedral.

16. The method of claim 15, wherein said net openings are rhombohedral.

* * * * *